(12) United States Patent
Burguera Albizuri et al.

(10) Patent No.: US 8,695,393 B2
(45) Date of Patent: Apr. 15, 2014

(54) MOTOR VEHICLE PEDALS AND MANUFACTURING METHODS THEREOF

(71) Applicant: Batz, S.Coop., Igorre (ES)

(72) Inventors: Fernando Burguera Albizuri, Bilbao (ES); Javier Salvador Delgado, Galdakao (ES); José Ignacio Garrido Ramos, Castro Urdiales (ES)

(73) Assignee: Batz, S. Coop., Igorre (ES)

( * ) Notice: Subject to any disclaimer, the term of this patent is extended or adjusted under 35 U.S.C. 154(b) by 0 days.

(21) Appl. No.: 13/656,343

(22) Filed: Oct. 19, 2012

(65) Prior Publication Data

US 2013/0101769 A1 Apr. 25, 2013

Related U.S. Application Data

(63) Continuation of application No. 13/656,296, filed on Oct. 19, 2012.

(30) Foreign Application Priority Data

Oct. 21, 2011 (ES) .................................. 201131700

(51) Int. Cl.
*B21D 7/025* (2006.01)
*B21D 9/01* (2006.01)

(52) U.S. Cl.
USPC ........ 72/370.04; 72/56; 72/370.01; 72/465.1; 72/466.2; 72/466.8

(58) Field of Classification Search
USPC .......... 72/56, 57, 370.01, 370.04, 465.1, 466, 72/466.2, 466.8
See application file for complete search history.

(56) References Cited

U.S. PATENT DOCUMENTS

| | | | | |
|---|---|---|---|---|
| 3,572,083 A | * | 3/1971 | Schmitt | 72/466 |
| 3,744,340 A | | 7/1973 | Peterson | |
| 4,352,285 A | * | 10/1982 | LaRue et al. | 72/466 |
| 4,569,256 A | * | 2/1986 | Pepper | 76/107.8 |
| 4,598,457 A | | 7/1986 | Kiwak et al. | |

(Continued)

FOREIGN PATENT DOCUMENTS

| | | |
|---|---|---|
| CA | 2236179 C | 9/2005 |
| EP | 1864725 A1 | 12/2007 |

(Continued)

*Primary Examiner* — David B Jones
(74) *Attorney, Agent, or Firm* — Tim L. Kitchen; Peter B. Scull; Hamilton DeSanctis & Cha, LLP

(57) ABSTRACT

According to an implementation a method for manufacturing a pedal for a motor vehicle is provided. The method comprising inserting into a hollow profile a flexible yet substantially incompressible retainer member and subsequently applying one or more forces to an external surface of the hollow profile to induce a change in shape of the hollow profile from a first shape to a second shape. The substantial incompressibility of the retainer member inhibiting deformations in the internal wall surface of the hollow profile as the one or more forces are applied to the external wall surface of the hollow profile so that the internal wall surface is substantially free of deformations upon the hollow profile assuming the second shape, the flexibility of the retainer member allowing it to bend in the direction of the applied one or more forces to accommodate a change in shape of the hollow profile from the first shape to the second shape.

18 Claims, 6 Drawing Sheets

(56) References Cited

U.S. PATENT DOCUMENTS

| | | | |
|---|---|---|---|
| 4,744,233 A * | 5/1988 | Trudell | 72/150 |
| 5,070,717 A | 12/1991 | Boyd et al. | |
| 5,131,254 A * | 7/1992 | White | 72/387 |
| 5,435,205 A | 7/1995 | Seksaria et al. | |
| 5,575,181 A | 11/1996 | Baumann et al. | |
| 2001/0032488 A1 | 10/2001 | Millman et al. | |

FOREIGN PATENT DOCUMENTS

| | | |
|---|---|---|
| ES | 2269332 T3 | 4/2007 |
| FR | 2523742 A1 | 9/1986 |
| FR | 2821684 A1 | 9/2002 |
| GB | 2325511 A | 11/1998 |
| JP | 2010247757 A | 11/2010 |

* cited by examiner

MOTOR VEHICLE PEDALS AND MANUFACTURING METHODS THEREOF

CROSS-REFERENCE TO RELATED APPLICATIONS

This application relates to and claims priority to Spanish Patent Application No. P201131700, filed Oct. 21, 2011.

TECHNICAL FIELD

This invention relates to a method for manufacturing a pedal for a motor vehicle and a pedal obtained according to the manufacturing method.

BACKGROUND

Known motor vehicle pedals have irregular shapes in more than one direction, their manufacture being complex. For their fabrication, on many occasions the process starts with a closed contour obtained by different techniques and subsequently subjected to bending, curving and/or cutting operations.

Spanish Publication No. ES2269332T3 describes a manufacturing method in which in order to avoid welding, the process starts with a conical pipe, the final shape of the pedal being obtained by means of a series of bending and flattening operations on one part of it.

One problem associated with these manufacturing methods is the generation of internal deformations inside the hollow pipe or closed hollow profile when they are subjected to forming operations.

SUMMARY OF THE DISCLOSURE

According to some implementations a manufacturing method is provided that comprises at least one stamping stage. In some implementations the pedal comprises a hollow profile inside which is inserted at least one retainer member that is flexible and substantially incompressible. The retainer member is inserted inside the profile of the pedal before the corresponding stamping stage is performed.

As a result, during the stamping stage internal deformations caused by the bending of the profile of the pedal towards its interior are inhibited or otherwise prevented from occurring. Said internal deformations are generated, in particular, on pedals with very pronounced curvatures, defined with small radii, or on pedals having excessive width. As well as not being aesthetic, internal deformations are harmful to the subsequent mechanical behaviour of the pedal and may even make the pedal impossible to manufacture.

The retainer member is flexible so that it may adapt to the deformations of the profile of the pedal in the direction of stamping, allowing stamping to be carried out in a simple manner. In addition, said retainer member is substantially incompressible, in order to prevent deformations of the profile occurring in other directions, in particular deformations towards the inside of the profile during said stamping.

These and other advantages and characteristics will be made evident in the light of the drawings and the detailed description thereof.

DETAILED DESCRIPTION

FIGS. 1, 2 and 4 to 6 schematically show a process for manufacturing a pedal 1 adapted to a motor vehicle, according to an implementation. The process for manufacturing also applies to structures other than motor vehicle pedals. The pedal 1 obtained according to a manufacturing method, described below, comprises a metal hollow profile 3, with a substantially rectangular cross-profile, and at least one retainer member 2 housed inside the profile 3, said retainer member 2 being arranged trapped inside the profile 3. According to some implementations the stamped profile 3 obtained does not include internal deformations, or is substantially free of internal deformations.

Figure 1:
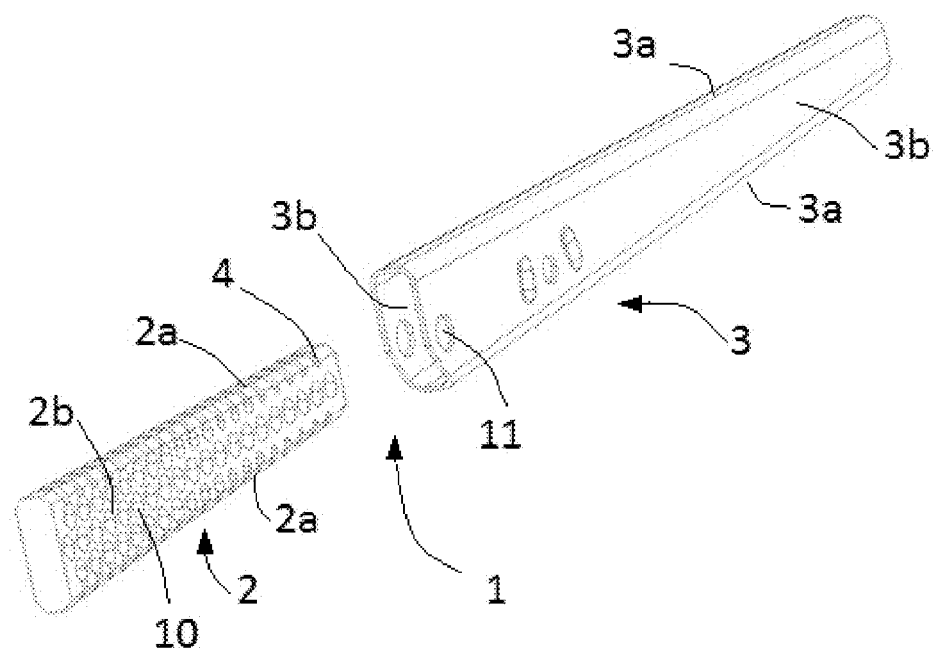
FIG. 1 shows an exploded view of the pedal, which comprises a profile and a retainer member, prior to being formed.
Figure 2:
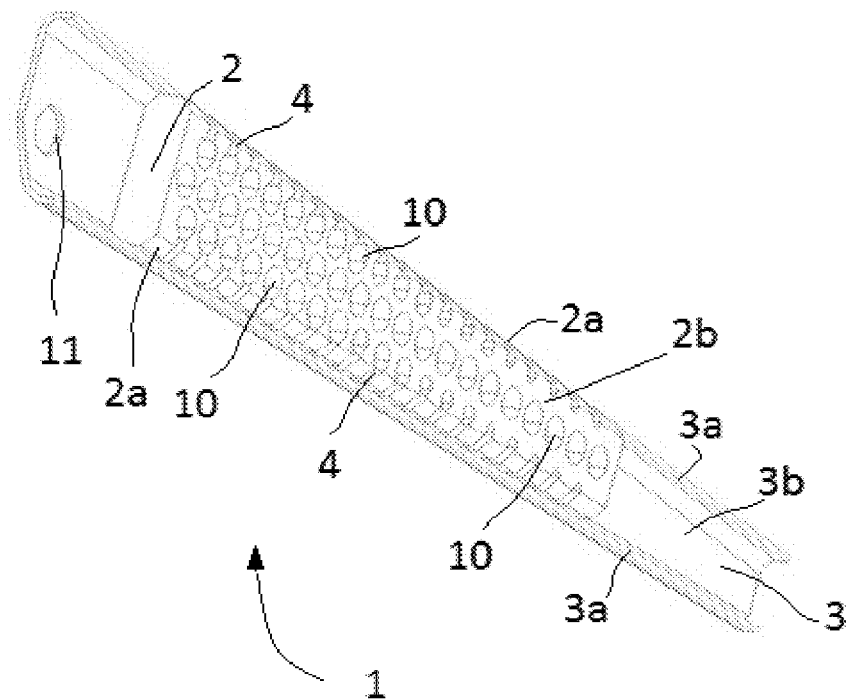
FIG. 2 shows a sectional view of the pedal shown in FIG. 1, with the retainer member inserted inside the profile, prior to being formed.

In order to obtain the pedal 1, the process according to some implementations starts with a hollow profile 3, with a substantially prismatic shape, inside which is inserted a retainer member 2, as shown in FIGS. 1 and 2. The retainer member 2 has a shape adapted to the internal shape of the profile 3, the shape of the substantially prismatic profile 3 being defined by side walls 3b substantially parallel to each other and front walls 3a. As a result, when said retainer member 2 is inserted inside the profile 3 it is retained inside the profile 3 by the shape of the profile 3 itself.

In the implementation shown in the figures, the retainer member 2 has a substantially quadrilateral cross-profile and comprises side walls 2b, substantially parallel to each other, and front walls 2a that longitudinally connect the side walls 2b to each other. In the implementation shown in the figures, the side walls 2b of the retainer member 2 are arranged to face the side walls 3b of the hollow profile 3 and the front walls 2a of the retainer member 2 are arranged to face the front walls 3a of the hollow profile 3.

In other implementations, not shown in the figures, both the profile 3 and the retainer member 2 may have a substantially pyramidal shape or other shapes, in which the respective side walls 3b, 2b are not parallel to each other. In other implementations the shape may even be conical.

According to some implementations once the retainer member 2 is housed inside the profile 3, the pedal 1 is subjected to a first stamping stage. In said first stage, the pedal 1 is subjected to at least one load F1, F1', F1" on at least one front wall 3a of the profile 3, in a direction substantially orthogonal to the front wall 3a. In the implementation shown in the figures, the pedal 1 is subjected during the first stage to various consecutive stamping operations, in each of which a load F1, F1', F1" is exerted on the corresponding front wall 3a of the profile 3, said respective load being transmitted to the respective front wall 2a of the retainer member 2, and the pedal 1 adopting the geometric shape shown in FIG. 4. The loads F1, F1', F1" do not have to be equal, said loads being exerted on different points along the corresponding front wall 3a.

According to some implementations, after the first stamping stage, the pedal 1 is subjected to a second stamping stage. In the second stage the pedal 1 is subjected to at least one load F2, F2', F2" on at least one side wall 3b of the profile 3, in a direction substantially orthogonal to said side wall 3b. In the embodiment shown in the figures, the pedal 1 is subjected during the second stage to various consecutive stamping operations, in each of which is respectively exerted a load F2, F2', F2" on a side wall 3b of the profile 3, said respective load being transmitted to the respective side wall 2b of the retainer member 2, and the pedal 1 adopting the geometric shape shown in FIG. 5. The loads F2, F2', F2" do not have to be equal, said loads being exerted on different points along the side wall 3b correspondingly.

Figure 3:
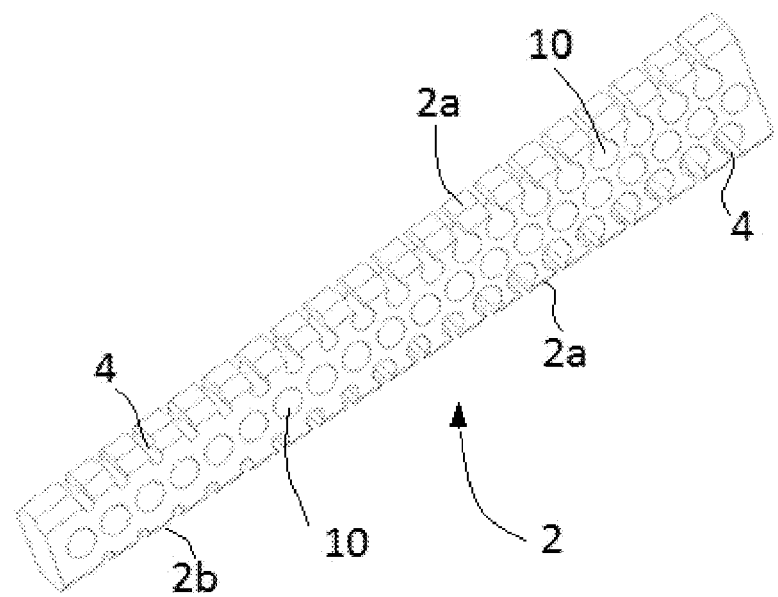
FIG. 3 shows another view in perspective of the retainer member shown in FIG. 1.
Figure 8:
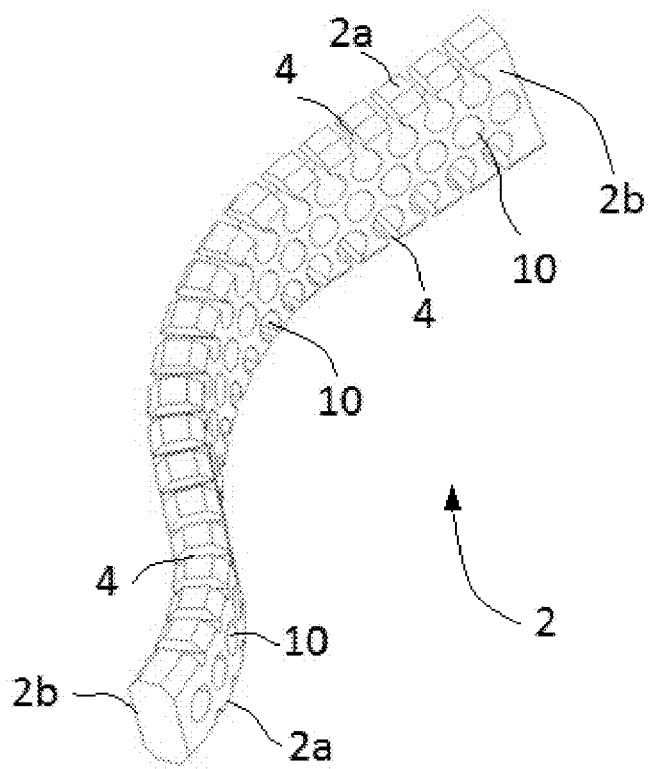
FIG. 8 shows a view in perspective of the retainer member shown in FIG. 1, after the pedal has been formed.
Figure 4:
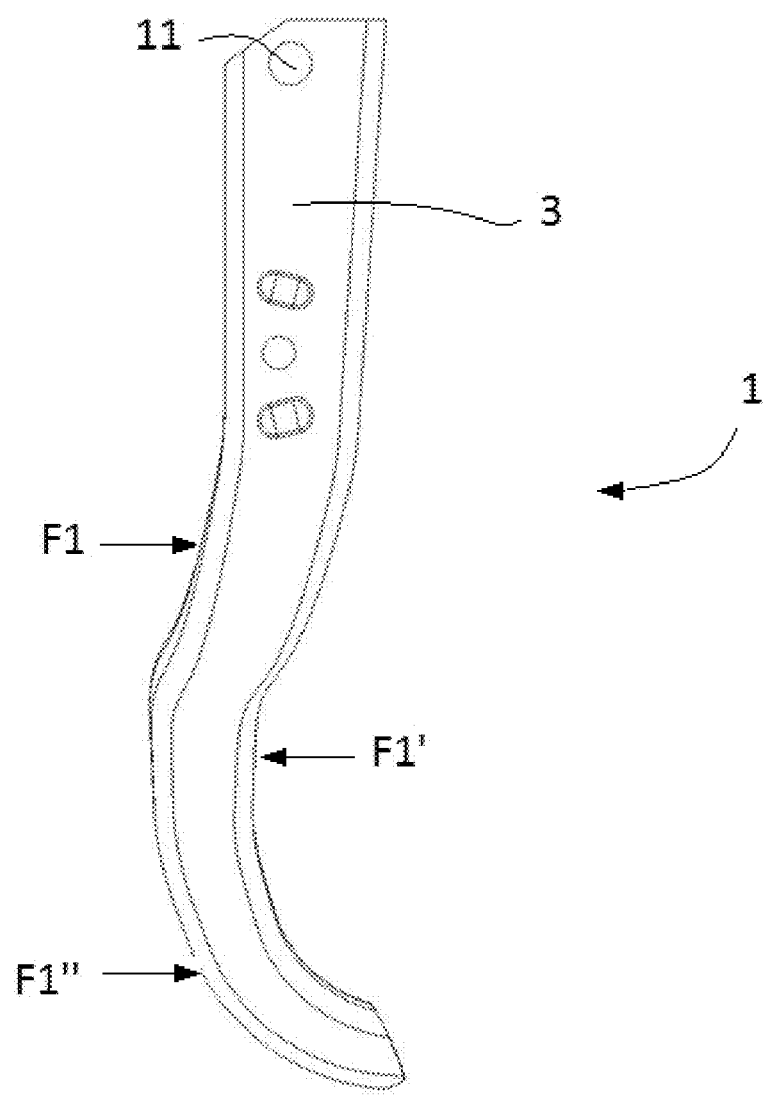
FIG. 4 shows a side view of the pedal shown in FIG. 1, after a first forming stage.
Figure 5:
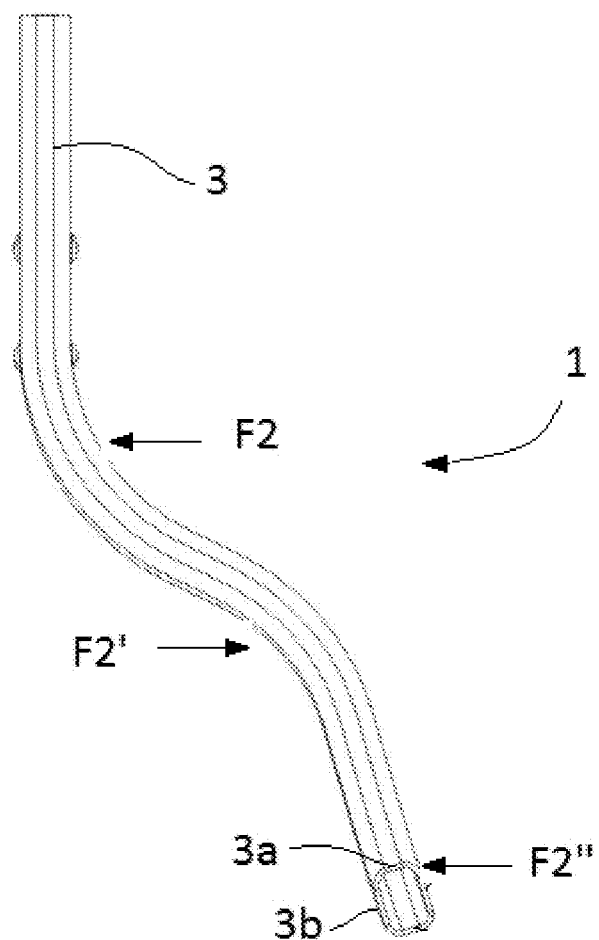
FIG. 5 shows a front view of the pedal shown in FIG. 1, after a second forming stage.

The retainer member 2, shown in detail in FIGS. 3 and 8, is flexible and substantially incompressible. As a result, the retainer member 2 is flexible in the direction of application of the loads F1, F1', F1", F2, F2' and F2", adapting itself to the respective deformations of the side walls 3b or front walls 3a of the profile 3, side walls 3b or front walls 3a, where the corresponding load F1, F1', F1", F2, F2' and F2" is applied. At the same time, the retainer member 2 is substantially incompressible, the distance between the side walls 3b and the front walls 3a respectively being substantially maintained. For this purpose, according to some implementations, the retainer member 2 comprises a plurality of cross-profiles 4 arranged along the front walls 2a, substantially transversal to said front walls 2a. In the implementation shown in the figures, the profile 4 is a gap that passes substantially orthogonally through the side walls 2b. The gaps 4 are arranged spaced along the length of the retainer member 2.

As a result, when the loads F1, F1' and F1" are applied on the respective front walls 3a of the profile 3, the gaps 4 allow the retainer member 2 to bend in the direction of application of the loads, allowing the profile 3, in particular the front walls 3a, to become deformed in said direction. Thanks to the incompressibility of said retainer member 2, deformations in other directions are prevented, in particular deformations of the front walls 3a of the profile 3 are prevented, the distance between both front walls 3a being kept constant or substantially constant.

In addition, when the loads F2, F2' and F2" are applied on the respective side walls 3b of the profile 3, the gaps 4, which also pass through the side walls 2b of the retainer member 2, allow said retainer member 2 to bend in the direction of application of the loads, allowing the profile 3, in particular the side walls 3b, to become deformed in said direction. As in the previous stage, thanks to the incompressibility of said retainer member 2, deformations in other directions are prevented, in particular deformations of the front walls 3a of the profile 3 are prevented, the distance between both side walls 3b being kept constant or substantially constant.

As a result, a stamped profile of a pedal is obtained and which does not include internal deformations or is substantially free of internal deformations.

In some implementation the retainer member 2 is made of a plastic material, in particular high-density polyethylene. In other embodiments not shown in the figures, the material may be polypropylene, polystyrene, polyethylene, polyamide or even an elastomer that is flexible and substantially incompressible, while other materials that fulfil both requirements may also be used.

In some implementations the retainer member 2 also comprises holes 10 that are arranged longitudinally spaced out, said holes 10 passing through the side walls 2b of the retainer member 2. The holes 10 lighten the weight of the retainer member 2 as well as making said retainer member 2 flexible. In the implementation shown, some holes 10 are connected to the corresponding gaps 4, thereby increasing the flexibility of the retainer member 2 in the area.

In other implementations not shown in the figures, the retainer member 2 may not comprise the gaps 4 and the holes 10, as long as the material used is sufficiently flexible, substantially incompressible, and is not too heavy.

Figure 6:
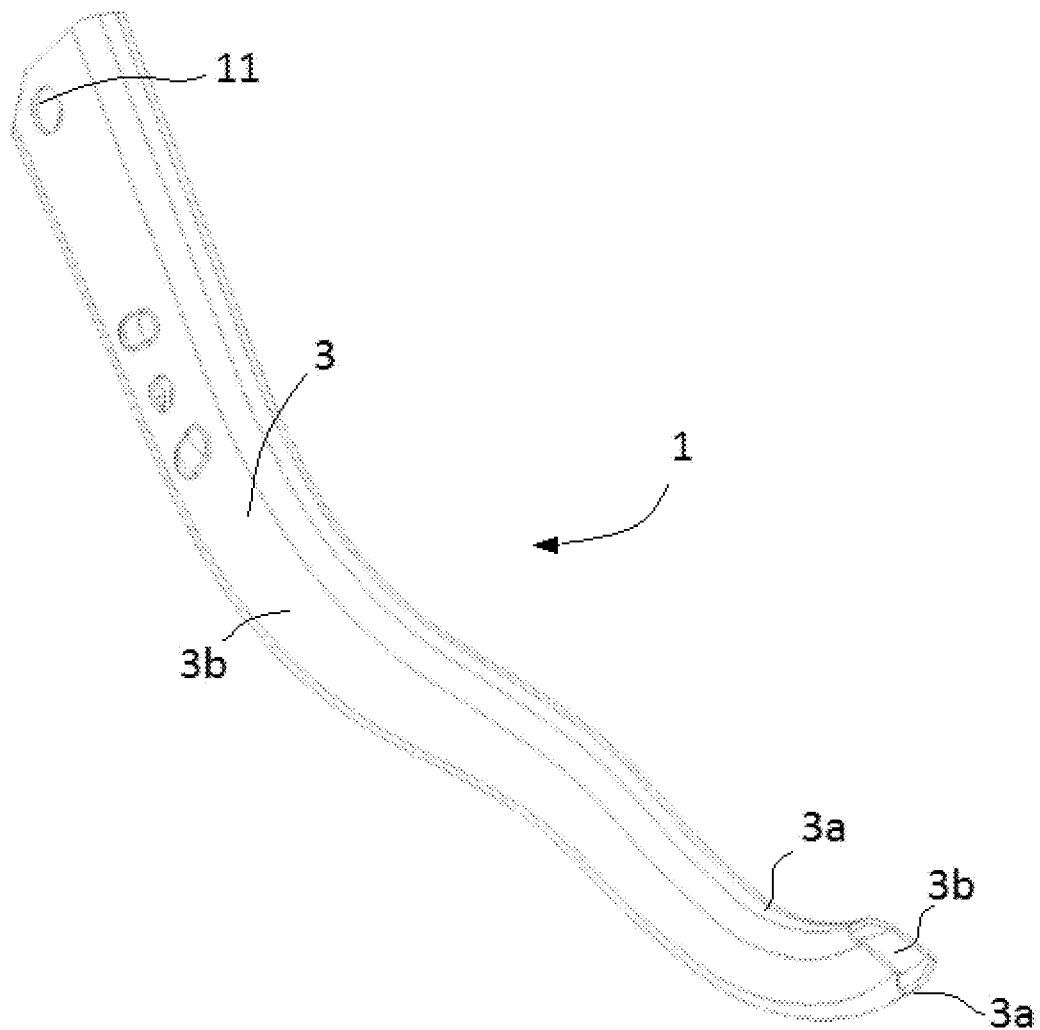
FIG. 6 shows a view in perspective of the pedal shown in FIG. 1, after the pedal has been formed.
Figure 7:
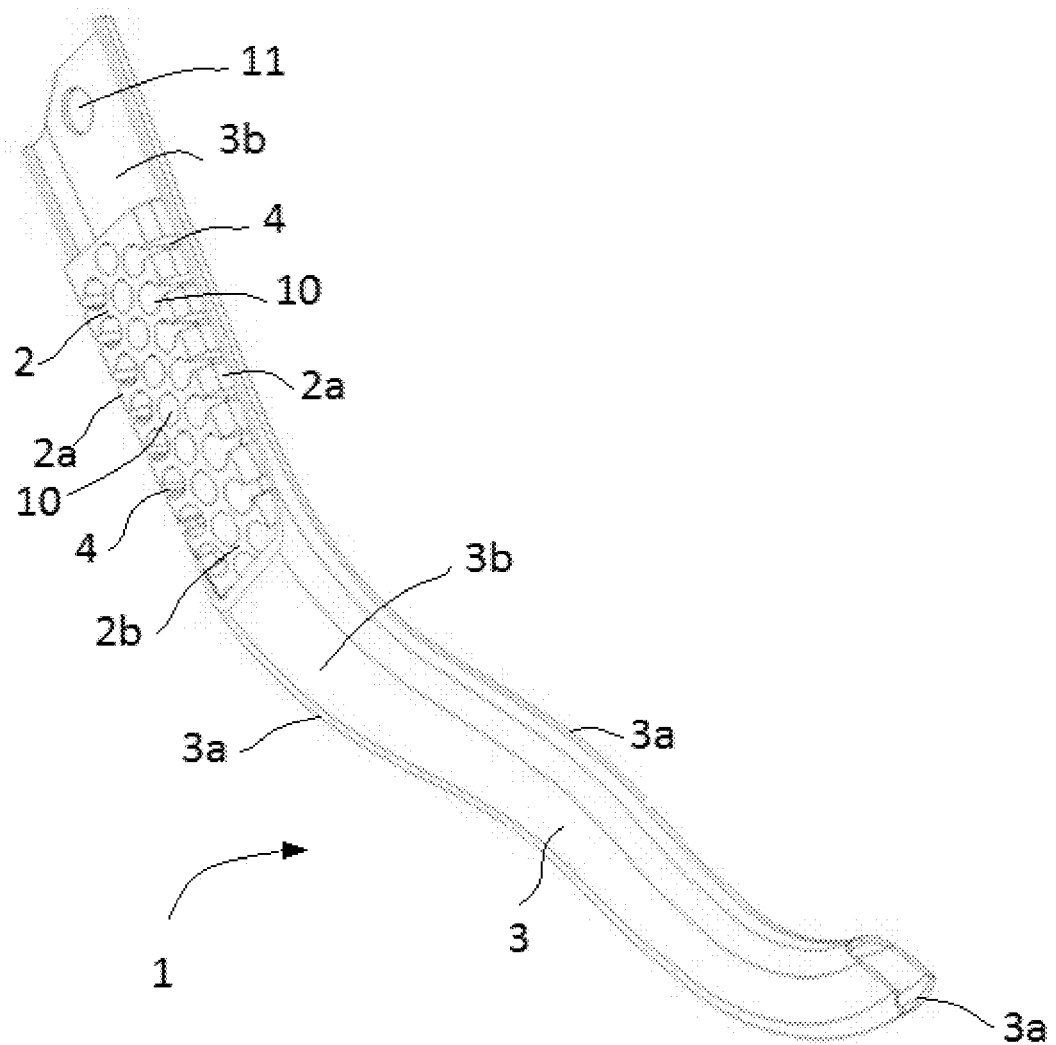
FIG. 7 shows a partially sectional view of the pedal shown in FIG. 1, after the pedal has been formed.

FIGS. 6 and 7 show a motor vehicle pedal 1 manufactured by means of a manufacturing method according to one implementation. In the implementation shown in the figures, the pedal 1 comprises a single retainer member 2, while in other implementations not shown in the figures the pedal 1 may comprise a plurality of retainer members 2 arranged adjacent to each other inside the profile 3.

The present description does not include specific details of the bending or stamping stages or the machines and tools on which said stages are performed, as they are known in the art and are not considered necessary for the correct understanding of the implementations disclosed and contemplated herein.

In addition, in the implementation shown in the figures the profile 3 comprises holes 11 for the passage of an axis of rotation of the pedal 1, not shown in the figures. In other embodiments, said holes may be formed in the profile 3 at a later stage.

The pedal 1 may be a brake pedal, accelerator or even a clutch.

What is claimed is:

1. A structure having a first shape that is capable of assuming a second shape upon one or more forces being applied to an external wall surface thereof, the structure comprising:
    a metallic rigid member having a hollow interior with an internal wall surface, the metallic rigid member having an external wall surface that is the external wall surface of the structure; and
    a flexible yet substantially incompressible retainer member disposed within the hollow interior of the metallic rigid member, the retainer member having an external wall surface that is adapted to the internal wall surface of the metallic rigid member, the flexibility of the retainer member allowing it to bend in the direction of the one or more applied forces to accommodate a change in shape of the structure from the first shape to the second shape, the substantial incompressibility of the retainer member inhibiting deformations in the internal wall surface of the metallic rigid member upon the one or more forces being applied to the external wall surface of the structure;
    wherein the metallic rigid member comprises first and second side walls and first and second front walls, an interior surface of each of the first side wall, second side wall, first front wall and second front wall of the metallic rigid member collectively forming the internal wall surface of the metallic rigid member; the retainer member comprising first and second side walls and first and second front walls, an exterior surface of each of the first side wall, second side wall, first front wall and second front wall of the retainer member collectively forming the external wall surface of the retainer member, the exterior surface of each of the first and second front walls of the retainer member comprising a plurality of spaced-apart gaps along a length thereof;

wherein the retainer member comprises a plurality of spaced-apart holes that extend through the first and second side walls of the retainer member.

2. A structure according to claim 1, wherein at least some of the plurality of gaps extend into at least some of the plurality of spaced-apart holes that extend through the first and second side walls of the retainer member.

3. A structure according to claim 1, wherein the retainer member is made of a plastic material.

4. A structure according to claim 3, wherein the plastic material is selected from the group consisting of: polypropylene, polystyrene, polyethylene and polyamide.

5. A structure according to claim 3, wherein the plastic material comprises high-density polyethylene.

6. A structure according to claim 1, wherein the retainer member is made from an elastomer that is flexible and substantially incompressible.

7. A structure having a first shape and that is capable of assuming a second shape upon one or more forces being applied to an external wall surface thereof, the structure comprising:
a metallic rigid member having a hollow interior with an internal wall surface, the metallic rigid member comprising first and second side walls separated by a first distance and first and second front walls separated by a second distance, an interior surface of each of the first side wall, second side wall, first front wall and second front wall collectively forming the internal wall surface of the metallic rigid member, the metallic rigid member having an external surface that is the external surface of the structure; and
a flexible yet substantially incompressible retainer member disposed within the hollow interior of the metallic rigid member, the retainer member having an external wall surface that is adapted to the internal wall surface of the metallic rigid member, the flexibility of the retainer member allowing it to bend in the direction of the applied one or more forces to accommodate a change in shape of the structure from the first shape to the second shape, the substantial incompressibility of the retainer member keeping the first distance and the second distance substantially constant upon the one or more forces being applied to the external wall surface of the structure;
wherein the retainer member comprises first and second side walls and first and second front walls, an exterior surface of each of the first side wall, second side wall, first front wall and second front wall of the retainer member collectively forming the external wall surface of the retainer member, the exterior surface of each of the first and second front walls of the retainer member comprising a plurality of spaced-apart gaps along a length thereof;
wherein the retainer member comprises a plurality of spaced-apart holes that extend through the first and second side walls of the retainer member.

8. A structure according to claim 7, wherein at least some of the plurality of gaps extend into at least some of the plurality of spaced-apart holes that extend through the first and second side walls of the retainer member.

9. A structure according to claim 7, wherein the retainer member is made of a plastic material.

10. A structure according to claim 9, wherein the plastic material is selected from the group consisting of: polypropylene, polystyrene, polyethylene and polyamide.

11. A structure according to claim 9, wherein the plastic material comprises high-density polyethylene.

12. A structure according to claim 7, wherein the retainer member is made from an elastomer that is flexible and substantially incompressible.

13. A structure having a first shape that is capable of assuming a second shape upon one or more forces being applied to an external wall surface thereof, the structure comprising:
a metallic rigid member having a hollow interior with an internal wall surface, the metallic rigid member having an external wall surface that is the external wall surface of the structure; and
a flexible yet substantially incompressible retainer member disposed within the hollow interior of the metallic rigid member, the retainer member having an external wall surface that is adapted to the internal wall surface of the metallic rigid member, the flexibility of the retainer member allowing it to bend in the direction of the one or more applied forces to accommodate a change in shape of the structure from the first shape to the second shape, the substantial incompressibility of the retainer member inhibiting deformations in the internal wall surface of the metallic rigid member upon the one or more forces being applied to the external wall surface of the structure;
wherein the metallic rigid member comprises first and second side walls and first and second front walls, an interior surface of each of the first side wall, second side wall, first front wall and second front wall of the metallic rigid member collectively forming the internal wall surface of the metallic rigid member; the retainer member comprising first and second side walls and first and second front walls, an exterior surface of each of the first side wall, second side wall, first front wall and second front wall of the retainer member collectively forming the external wall surface of the retainer member, the exterior surface of each of the first and second front walls of the retainer member comprising a plurality of spaced-apart gaps along a length thereof;
wherein the retainer member comprises a plurality of spaced-apart holes that extend partially into one or both of the first and second side walls of the retainer member.

14. A structure according to claim 13, wherein at least some of the plurality of gaps extend into at least some of the plurality of spaced-apart holes that extend partially through the first and second side walls of the retainer member.

15. A structure according to claim 13, wherein the retainer member is made of a plastic material.

16. A structure according to claim 15, wherein the plastic material is selected from the group consisting of: polypropylene, polystyrene, polyethylene and polyamide.

17. A structure according to claim 15, wherein the plastic material comprises high-density polyethylene.

18. A structure according to claim 13, wherein the retainer member is made from an elastomer that is flexible and substantially incompressible.

* * * * *